US012142197B2

(12) United States Patent
Gu et al.

(10) Patent No.: US 12,142,197 B2
(45) Date of Patent: Nov. 12, 2024

(54) DISPLAY PANEL AND DISPLAY APPARATUS

(71) Applicants: BOE MLED Technology Co., Ltd., Beijing (CN); BOE Technology Group Co., Ltd., Beijing (CN)

(72) Inventors: Qibing Gu, Beijing (CN); Guofeng Hu, Beijing (CN); Xiuling Li, Beijing (CN); Bao Fu, Beijing (CN); Jiayi Li, Beijing (CN); Xiurong Wang, Beijing (CN); Yicheng Lin, Beijing (CN); Lingyun Shi, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/271,674

(22) PCT Filed: Dec. 30, 2021

(86) PCT No.: PCT/CN2021/143325
§ 371 (c)(1),
(2) Date: Jul. 11, 2023

(87) PCT Pub. No.: WO2023/123273
PCT Pub. Date: Jul. 6, 2023

(65) Prior Publication Data

US 2024/0062708 A1 Feb. 22, 2024

(51) Int. Cl.
*G09G 3/32* (2016.01)

(52) U.S. Cl.
CPC ....... *G09G 3/32* (2013.01); *G09G 2300/0408* (2013.01); *G09G 2300/0426* (2013.01);
(Continued)

(58) Field of Classification Search
None
See application file for complete search history.

(56) References Cited

U.S. PATENT DOCUMENTS

2015/0364107 A1* 12/2015 Sakariya ................. G06F 3/042
345/82
2017/0330508 A1 11/2017 Saito et al.
(Continued)

FOREIGN PATENT DOCUMENTS

CN 110010093 A 7/2019
CN 111968567 A 11/2020
(Continued)

OTHER PUBLICATIONS

International Search Report for PCT/CN2021/143325 Mailed Sep. 29, 2022.

*Primary Examiner* — Nitin Patel
*Assistant Examiner* — Amen W Bogale
(74) *Attorney, Agent, or Firm* — Ling Wu; Stephen Yang; Ling and Yang Intellectual Property

(57) ABSTRACT

Disclosed are a display panel and a display apparatus, wherein the display panel includes a plurality of first signal lines extending along a first direction and a plurality of pixel units arranged in an array in the first direction and a second direction; at least one pixel unit among the plurality of pixel units includes a component group and a drive chip configured to drive the component group to emit light; the component group includes K light emitting elements, and the drive chip includes K signal channel terminals, K is a positive integer greater than or equal to 2; for a pixel unit in a j-th row and an i-th column, cathodes of the K light emitting elements are electrically connected with an i-th first signal line, and an anode of an s-th light emitting element is electrically connected with an s-th signal channel terminal of the drive chip.

19 Claims, 10 Drawing Sheets

(52) U.S. Cl.
CPC ............... *G09G 2300/0828* (2013.01); *G09G 2310/0291* (2013.01); *G09G 2320/041* (2013.01); *G09G 2320/0626* (2013.01); *G09G 2330/021* (2013.01)

(56) References Cited

U.S. PATENT DOCUMENTS

| | | | | |
|---|---|---|---|---|
| 2019/0206319 | A1* | 7/2019 | Kim | G09G 3/2022 |
| 2023/0326398 | A1 | 10/2023 | Li et al. | |

FOREIGN PATENT DOCUMENTS

| | | | |
|---|---|---|---|
| CN | 213635308 | U | 7/2021 |
| CN | 113223444 | A | 8/2021 |
| CN | 113487997 | A | 10/2021 |
| CN | 115119521 | A | 9/2022 |

* cited by examiner

DISPLAY PANEL AND DISPLAY APPARATUS

CROSS-REFERENCE TO RELATED APPLICATION

The present application is a U.S. National Phase Entry of International Application No. PCT/CN2021/143325 having an international filing date of Dec. 30, 2021. The entire contents of the above-identified application are hereby incorporated by reference.

TECHNICAL FIELD

The present disclosure relates to, but is not limited to, the field of display technologies, and more particularly, to a display panel and a display apparatus.

BACKGROUND

Semiconductor Light Emitting Diode (LED for short) technologies have been under development for nearly 30 years, from an initial solid-state lighting power supply to a backlight source in the field of display, and then to an LED display screen, providing a solid foundation for its wider applications. With development of chip manufacturing and encapsulation technologies, Mini Light Emitting Diode (Mini LED for short) display and Micro Light Emitting Diode (Micro LED for short) display has gradually become a hot spot of display technologies. The micro LED display is mainly used in fields such as Augmented Reality/Virtual Reality (AR/VR) and the mini LED display is mainly used in fields such as TV and outdoor display.

SUMMARY

The following is a summary of subject matters described herein in detail. The summary is not intended to limit the protection scope of claims.

In a first aspect, an embodiment of the present disclosure provides a display panel, including: a plurality of first signal lines extending along a first direction and a plurality of pixel units arranged in an array in the first direction and a second direction; wherein the plurality of first signal lines are arranged along the second direction, and the first direction and the second direction intersect; at least one pixel unit among the plurality of pixel units includes a component group and a drive chip configured to drive the component group to emit light; the component group includes K light emitting elements, and the drive chip includes K signal channel terminals, wherein K is a positive integer greater than or equal to 2; for a pixel unit in a j-th row and an i-th column, cathodes of the K light emitting elements are electrically connected with an i-th first signal line, and anodes of the K light emitting elements are respectively electrically connected with the K signal channel terminals in the drive chip, $1 \le j \le M$, $1 \le i \le N$, and i and j are positive integers.

In some possible implementation modes, the drive chip further includes: a fixed voltage signal terminal; a fixed voltage signal terminal of a drive chip of the pixel unit in the j-th row and the i-th column is electrically connected with the i-th first signal line.

In some possible implementation modes, further including: a plurality of second signal lines extending along the first direction and a plurality of third signal lines extending along the first direction, wherein the plurality of second signal lines are arranged along the second direction, and the plurality of third signal lines are arranged along the second direction; the drive chip further includes a data signal terminal and an addressing signal terminal; a data signal terminal of a drive chip of the pixel unit in the j-th row and the i-th column is electrically connected with an i-th second signal line, and an addressing signal terminal of the drive chip of the pixel unit in the j-th row and the i-th column is electrically connected with an i-th third signal line.

In some possible implementation modes, the i-th first signal line and the i-th second signal line are respectively located on two sides of an i-th column of pixel units, and the i-th second signal line and the i-th third signal line are located on a same side of the i-th column of pixel units.

In some possible implementation modes, a component group of the pixel unit in the j-th row and the i-th column is located on a side of the drive chip close to the i-th first signal line.

In some possible implementation modes, the first signal line is configured to transmit a ground signal.

In some possible implementation modes, K=3, and the K light emitting elements include: a red light emitting element, a green light emitting element, and a blue light emitting element; the drive chip includes a first signal channel terminal, a second signal channel terminal, and a third signal channel terminal; the first signal channel terminal is electrically connected with an anode of the red light emitting element; the second signal channel terminal is electrically connected with an anode of the green light emitting element; the third signal channel terminal is electrically connected with an anode of the blue light emitting element.

In some possible implementation modes, the drive chip includes: a low dropout regulator assembly, a data decoder, a data buffer, a data processing center, a data converter, and a drive assembly; the low dropout regulator assembly is electrically connected with the addressing signal terminal, the data decoder, and the data processing center, respectively, and is configured to convert a signal of the addressing signal terminal into a first voltage signal to supply power to the data decoder and the data processing center; the data decoder is electrically connected with the data signal terminal and the data buffer respectively, and is configured to decode a data signal provided by the data signal terminal to generate a first data signal, and transmit the first data signal to the data buffer; the data buffer is configured to store the first data signal in bits; the data processing center is electrically connected with the data buffer and the data converter respectively, and is configured to obtain the first data signal stored in the data buffer, perform logical conversion on the first data signal stored in the data buffer to generate a second data signal, and transmit the second data signal to the data converter; the data converter is electrically connected with the drive assembly, and is configured to perform digital-to-analog conversion on the second data signal to generate a digital-analog conversion signal, perform pulse width modulation on the second data signal to form a pulse width modulation signal, and transmit the digital-analog conversion signal and the pulse width modulation signal to the drive assembly; the drive assembly is electrically connected with the component group, and is configured to generate a pulse width control signal according to the pulse width modulation signal, generate a constant current control signal according to the digital-to-analog conversion signal, and provide an electrical signal to the component group according to the pulse width control signal and the constant current control signal.

In some possible implementation modes, the drive circuit further includes: a first Direct Current (DC) converter; the first DC converter is electrically connected with a third signal line and is configured to transmit a signal to the third signal line.

In some possible implementation modes, the low dropout regulator assembly is further configured to convert the signal of the third signal line into a second voltage signal.

In some possible implementation modes, the low dropout regulator assembly includes: a first low dropout regulator and a second low dropout regulator; the first low dropout regulator is electrically connected with the addressing signal terminal, the data decoder, and the data processing center, respectively, and is configured to convert the signal of the addressing signal terminal into the first voltage signal to supply power to the data decoder and the data processing center; the second low dropout regulator is electrically connected with the addressing signal terminal and is configured to convert the signal of the addressing signal terminal into the second voltage signal.

In some possible implementation modes, the low dropout regulator assembly is further configured to convert the signal of the addressing signal terminal into a third voltage signal; the drive assembly is configured to provide an electrical signal to the component group according to the pulse width control signal, the constant current control signal, the second voltage signal, and the third voltage signal.

In some possible implementation modes, the low dropout regulator assembly further includes: a third low dropout regulator; the third low dropout regulator is connected with the addressing signal terminal and is configured to convert the signal of the addressing signal terminal into the third voltage signal.

In some possible implementation modes, the drive assembly includes: a first driver, a second driver, and a third driver; the first driver is electrically connected with the data converter, the second low dropout regulator, and the first signal channel terminal, respectively, and is configured to provide an electrical signal to a light emitting element connected with the first signal channel terminal according to the pulse width control signal, the constant current control signal, and the second voltage signal; the second driver is electrically connected with the data converter, the third low dropout regulator, and the second signal channel terminal, respectively, and is configured to provide an electrical signal to a light emitting element connected with the second signal channel terminal according to the pulse width control signal, the constant current control signal, and the third voltage signal; the third driver is electrically connected with the data converter, the third low dropout regulator, and the third signal channel terminal, respectively, and is configured to provide an electrical signal to a light emitting element connected with the third signal channel terminal according to the pulse width control signal, the constant current control signal, and the third voltage signal.

In some possible implementation modes, the drive assembly is further electrically connected with the addressing signal terminal, and is configured to provide an electrical signal to the component group according to the pulse width control signal, the constant current control signal, and the signal of the addressing signal terminal.

In some possible implementation modes, the drive assembly includes: a first driver, a second driver, and a third driver; the first driver is respectively connected with the data converter, the second low dropout regulator, and the first signal channel terminal, respectively, and is configured to provide an electrical signal to the light emitting element connected with the first signal channel terminal according to the pulse width control signal, the constant current control signal, and the second voltage signal; the second driver is electrically connected with the data converter, the addressing signal terminal, and the second signal channel terminal, respectively, and is configured to provide an electrical signal to the light emitting element connected with the second signal channel terminal according to the pulse width control signal, the constant current control signal, and the signal of the addressing signal terminal; the third driver is electrically connected with the data converter, the addressing signal terminal, and the third signal channel terminal, respectively, and is configured to provide an electrical signal to the light emitting element connected with the third signal channel terminal according to the pulse width control signal, the constant current control signal, and the signal of the addressing signal terminal.

In some possible implementation modes, further including: a plurality of fourth signal lines extending along the first direction and a plurality of fifth signal lines extending along the first direction, wherein the plurality of fourth signal lines are arranged along the second direction, and the plurality of fifth signal lines are arranged along the second direction; the drive chip further includes a first power input terminal and a second power input terminal; a first power input terminal of the drive chip of the pixel unit in the j-th row and the i-th column is electrically connected with an i-th fourth signal line, and a second power input terminal of the pixel unit in the j-th row and the i-th column is electrically connected with an i-th fifth signal line.

In some possible implementation modes, further including: a second DC converter and a third DC converter; the second DC converter is electrically connected with a fourth signal line and is configured to transmit the second voltage signal to the fourth signal line; the third DC converter is electrically connected with a fifth signal line and is configured to transmit a third voltage signal to the fifth signal line.

In some possible implementation modes, the drive assembly includes: a first driver, a second driver, and a third driver; the first driver is electrically connected with the data converter, the first power input terminal, and the first signal channel terminal, respectively, and is configured to provide an electrical signal to a light emitting element connected with the first signal channel terminal according to the pulse width control signal, the constant current control signal, and the second voltage signal; the second driver is electrically connected with the data converter, the second power input terminal, and the second signal channel terminal, respectively, and is configured to provide an electrical signal to a light emitting element connected with the second signal channel terminal according to the pulse width control signal, the constant current control signal, and the third voltage signal; the third driver is electrically connected with the data converter, the second power input terminal, and the second signal channel terminal, respectively, and is configured to provide an electrical signal to a light emitting element connected with the third signal channel terminal according to the pulse width control signal, the constant current control signal, and the third voltage signal.

In some possible implementation modes, the drive chip further includes: an electrostatic discharge assembly; the electrostatic discharge component is electrically connected with a fixed voltage signal terminal.

In second aspect, the present disclosure also provides a display apparatus including the display panel described above.

Other aspects may be understood upon reading and understanding drawings and detailed description.

BRIEF DESCRIPTION OF DRAWINGS

Accompanying drawings are used for providing understanding for technical solutions of the present application and constitute a part of the specification, and are used for explaining the technical solutions of the present application together with embodiments of the present application, and do not constitute limitations on the technical solutions of the present application.

FIG. 5 is a timing diagram of a signal for controlling a signal channel terminal to be turned on.

FIG. 17 is a timing diagram of a signal for controlling a driver to be turned on.

DETAILED DESCRIPTION

Figure 1:
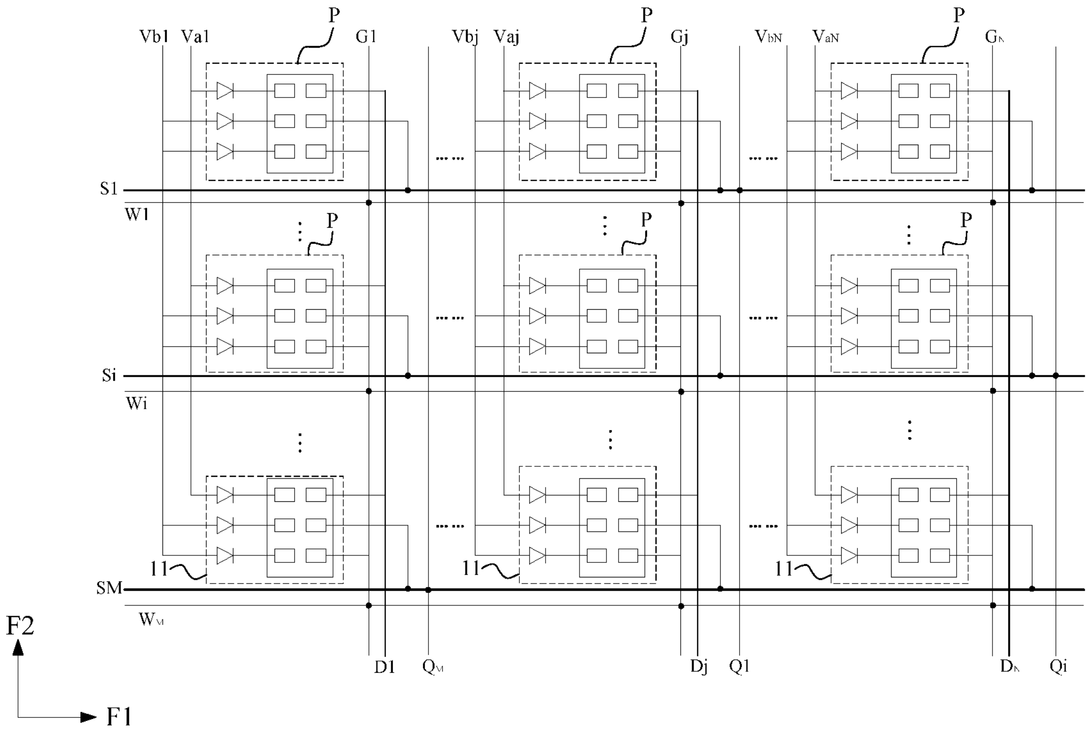
FIG. 1 is a schematic diagram of a planar structure of a display panel including a micro light emitting diode.

To make objectives, technical solutions, and advantages of the present disclosure clearer, the embodiments of the present disclosure will be described in detail with reference to the accompanying drawings. It is to be noted that implementation modes may be implemented in a plurality of different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the drawings, a size of each constituent element, a thickness of a layer, or a region is exaggerated sometimes for clarity. Therefore, one mode of the present disclosure is not necessarily limited to the size, and shapes and sizes of various components in the drawings do not reflect actual scales. In addition, the drawings schematically illustrate ideal examples, and one mode of the present disclosure is not limited to shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two elements. Those of ordinary skills in the art may understand specific meanings of these terms in the present disclosure according to specific situations.

In the specification, a transistor refers to an element which at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In a case that transistors with opposite polarities are used, in a case that a current direction changes during operation of a circuit, or the like, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switching elements such as transistors, resistors, inductors, capacitors, and other elements with various functions, etc.

In the specification, "parallel" refers to a state in which an angle formed by two straight lines is more than −10° and less than 10°, and thus also includes a state in which the angle is more than −5° and less than 5°. In addition, "perpendicular" refers to a state in which an angle formed by two straight lines is more than 80° and less than 100°, and thus also includes a state in which the angle is more than 85° and less than 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is not defined so strictly and numerical values within process and measurement error ranges are allowed.

At present, although the display market is dominated by two kinds of technologies of Liquid Crystal Display (LCD) and Organic Light Emitting Diode (OLED) display, due to limitations in a size of a substrate, a preparation device, and a process, etc., it is difficult for LCD and an OLED to implement oversized display. In contrast, a display panel with micro light emitting diodes as pixel points may achieve oversized display by means of infinite splicing. Generally, a large-size display panel may be an oversized display panel, formed by splicing a plurality of sub-display panels by a plurality of boxes, in which the plurality of boxes are fixed using cross beams or vertical beams and sub-display panels containing micro light emitting diodes are fixed in the boxes. Since a micro light emitting diode has advantages of self-illumination, a wide viewing angle, fast response, a simple structure, a small volume, lightness and thinness, energy saving, high efficiency, long life, and clear light, etc., the oversized display panel may achieve a high resolution (Pixels Per Inch, PPI for short).

For micro light emitting diodes, inorganic light-emitting elements are miniaturized, arrayed, and thin-filmed using a miniaturization process technology. Generally, a micro light emitting diode includes a Micro LED and a Mini LED. A typical size (e.g., length) of a Micro LED may be less than 80 μm e.g., from 10 μm to 50 μm, and does not include a growth substrate (such as sapphire); a typical size (e.g., length) of a Mini LED may be about 80 μm to 350 μm e.g., from 100 μm to 220 μm. By transferring micro light emitting diodes in batches to a display panel provided with a drive circuit, it may be achieved that each micro light emitting diode may be addressable and individually driven to light up.

Micro light emitting diodes may be applied to backlight partition control, and a drive mode of passive address selection drive is adopted for all of them. With development of technologies, micro light emitting diodes may also be directly used as pixel points in display products. In related technologies, a drive mode of passive address selection drive with common anodes is adopted, that is, anodes of a plurality of micro light emitting diodes are connected with a same signal line. However, an inventor of the present disclosure found that for this drive mode, with reduction of a display gap and improvement of display brightness, power consumption per unit area of a display product is getting higher and higher, and the power consumption is also getting larger and larger, which brings a problem of temperature rise of the display product and a problem of power supply capability; if a drive mode of active address selection drive is selected, a relatively small drive current may be used for achieving corresponding brightness, but if a connection mode with common anodes is still adopted, there are still related problems.

Figure 2:
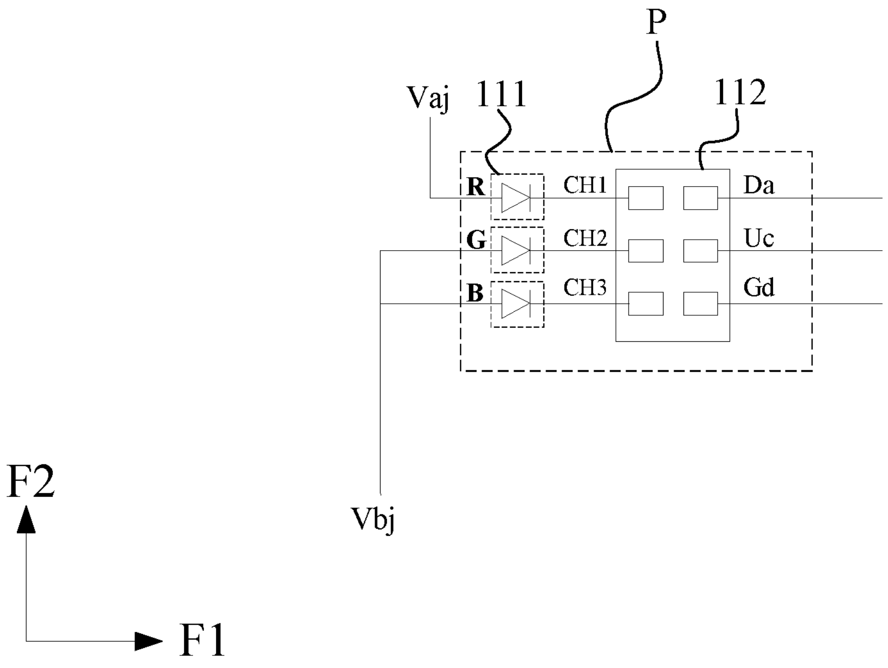
FIG. 2 is a schematic diagram of a connection relationship within pixels in FIG. 1.

FIG. 1 is a schematic diagram of a planar structure of a display panel including a micro light emitting diode, and FIG. 2 is a schematic diagram of a connection relationship within pixels in FIG. 1. As shown in FIG. 1 and FIG. 2, the display panel may include: a plurality of pixels P; the plurality of pixels P are arranged in an array in a first direction F1 and a second direction F2, and the first direction F1 and the second direction F2 intersect; at least one pixel P among the plurality of pixels P includes a sub-pixel 111 and a drive chip 112 for driving each sub-pixel 111 within the pixel 11; each sub-pixel 111 includes at least one light emitting diode; the drive chip 112 includes a data signal terminal Da, an addressing signal terminal Uc, a fixed voltage signal terminal Gd, and signal channel terminals CH1 to CH3; M address selection signal lines S, each address selection signal line Si ($0<i\leq M$, i is a positive integer) is electrically connected with addressing signal terminals Uc of drive chips 112 of pixels P arranged in the first direction F1; N data lines D, each data line Dj ($0<j\leq N$, j is a positive integer) is electrically connected with data signal terminals Da of drive chips 112 of pixels arranged in the second direction F2; M address selection signal transfer lines Q, each address selection signal transfer line Qi ($0<i\leq M$, i is a positive integer) is corresponding to an address selection signal line Si one by one, for example, an address selection signal transfer line $Q_1$ is corresponding to an address selection signal line $S_1$; N power supply signal lines Va and Vb, a power supply signal line $Va_j$ (or $Vb_j$) ($0<j\leq N$, j is a positive integer) is electrically connected with a first electrode of a light emitting diode; N fixed voltage signal lines G, a fixed voltage signal line $G_j$ ($0<j\leq N$, j is a positive integer) is electrically connected with fixed voltage signal terminals Gd of the drive chips 112 of the pixels arranged in the second direction F2; a second electrode of the light emitting diode is electrically connected with signal channel terminals CH1 to CH3 of the drive chip 112, the signal channel terminal CH1 of the drive chip 112 is connected with a second electrode of a light emitting diode R emitting red light, the signal channel terminal CH2 of the drive chip 112 is connected with a second electrode of a light emitting diode G emitting green light, and the signal channel terminal CH3 of the drive chip 112 is connected with a second electrode of a light emitting diode G emitting blue light.

As shown in FIGS. 1 and 2, a first electrode of a light emitting diode emitting green light and a first electrode of a light emitting diode emitting blue light are connected with a same power supply signal line Vb.

Herein, an address selection signal line S provides an operating voltage for a connected drive chip 112, a fixed voltage signal line G may provide a fixed voltage signal for the connected drive chip 112 to form a power supply loop, and signals of power supply signal lines Va and Vb pass through a light emitting diode and return to the fixed voltage signal line through the drive chip.

The display panel needs at least three power modules, an address selection signal line, a data line, an address selection signal transfer line, power supply signal lines Va and Vb, and a fixed voltage signal line, many devices and signal lines are needed, so that a sub-display panel occupies a larger area and a structure is more complicated.

Signals of the power supply signal lines Va and Vb are transmitted to a drive chip after passing through a light emitting diode. Power consumption of the drive chip includes power consumption of all signal channel terminals and power consumption of power supply of addressing signal terminals. Therefore, actual power consumption P of a drive chip 112 is as follows.

P=Vrch*Irch+Vgch*Igch+Vbch*Ibch+VCC*Ivcc

Herein, Vrch is a voltage value of the signal channel terminal CH1 of the drive chip 112, Irch is a value of a current flowing through the signal channel terminal CH1 of the drive chip 112, Vgch is a voltage value of the signal channel terminal CH2 of the drive chip 112, Irch is a value of a current flowing through the signal channel terminal CH2 of the drive chip 112, Vbch is a voltage value of the signal channel terminal CH3 of the drive chip 112, Ibch is a value of a current flowing through the signal channel terminal CH3 of the drive chip 112, VCC is a received voltage value of the addressing signal terminal Uc, and Ivcc is a value of a current flowing through the addressing signal terminal Uc of the drive chip 112.

Figure 3:
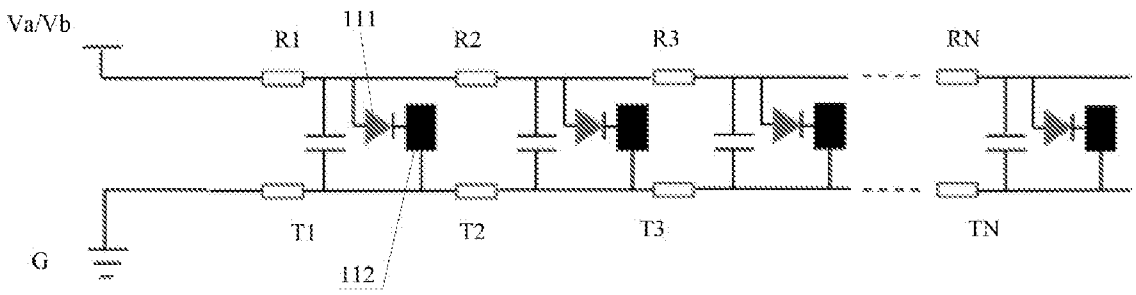
FIG. 3 is a diagram of a driving principle of light emitting diodes connected to a same power supply signal line among a plurality of pixels arranged in a second direction.
Figure 4:
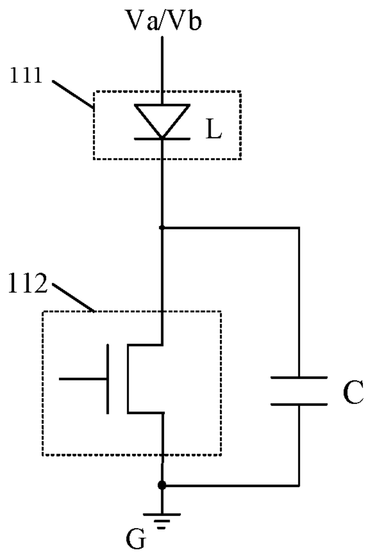
FIG. 4 is a diagram of a simplified driving principle of a sub-pixel.

FIG. 3 is a diagram of a driving principle of light emitting diodes connected to a same power supply signal line among a plurality of pixels arranged in a second direction, and FIG. 4 is a diagram of a simplified driving principle of a sub-pixel, as shown in FIGS. 3 and 4, herein, R1 to RN are loads of the power supply signal line Va/Vb, T1 to TN are loads of the fixed voltage signal line G, and C is a parasitic capacitance, C may include a parasitic capacitance of a sub-pixel 111, a parasitic capacitance of a drive chip, and an overlapping capacitance between signal lines. The drive chip 112 includes a thin film transistor for controlling whether a signal path is formed between the power supply signal line and the fixed voltage signal line G. As shown in FIGS. 3 and 4, when a quantity of pixels in the display panel is large, it is necessary to consider a problem of a voltage drop of the power supply signal line that inevitably exists on a transmission path. Voltage amplitudes Va and Vb provided by the power supply signal line should be large enough to ensure that all light emitting diodes may be turned on at a constant current, so that there will be a large voltage difference in voltage amplitudes at anodes of light emitting diodes in two pixels connected with a same power supply signal line but farthest away from each other, while power consumption of a drive chip in a pixel connected with one end of the power supply signal line with a relatively large voltage amplitude is relatively high and heat generation is relatively serious.

Figure 5:
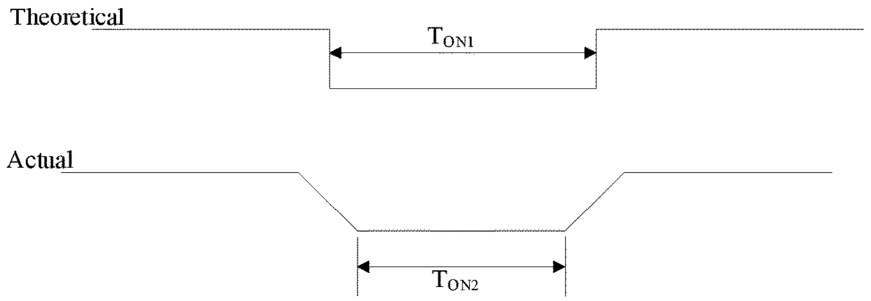

FIG. 5 is a timing diagram of a signal for controlling a signal channel terminal to be turned on. As shown in FIG. 4, when the thin film transistor included in the drive chip 112 is in an off state, the parasitic capacitance C will be charged to a certain voltage. For example, when a voltage of the power supply signal line is 2.7 V, a voltage of the parasitic capacitance C will be charged to more than 1.3 V to ensure that a light emitting diode L cannot emit light. When the thin film transistor included in the drive chip 112 is in an on state, a signal path is formed between the power supply signal line and the fixed voltage signal line G, the parasitic capacitance C starts to discharge, and the light emitting diode L may emit light. In fact, as shown in FIG. 5, if a theoretical duration of a signal path formed between the power supply signal line and the fixed voltage signal line G is $T_{ON1}$, and an actual light emitting duration of the light emitting diode L is $T_{ON2}$, wherein $T_{ON1}$ is greater than $T_{ON2}$, when the signal path is formed and disconnected, there will be certain rising edge time or falling edge time, which is not instantaneous jump, so that overall opening time of the signal path will be shortened relative to a theoretical situation. In addition, after the signal path is formed, a current in the signal path is of the order of μA, which makes a discharge rate of the parasitic capacitance C very slow. The parasitic capacitance C needs to be discharged until it is met that the light emitting diode L included in the sub-pixel 111 will emit light only when the sub-pixel 111 is able to work, so a light emitting duration of the light emitting diode L is shorter than a theoretical light emitting duration, and thus a gray scale cannot be accurately displayed, which further affects adversely a display effect of the display panel.

In addition, in a case that the signal path is disconnected, due to presence of an address selection signal line, a line in the signal path is affected by noise adversely, and there will also be weak leakage, a case that a light emitting diode emits light is prone to happen, which will affect the display effect of the display panel adversely.

Figure 6:
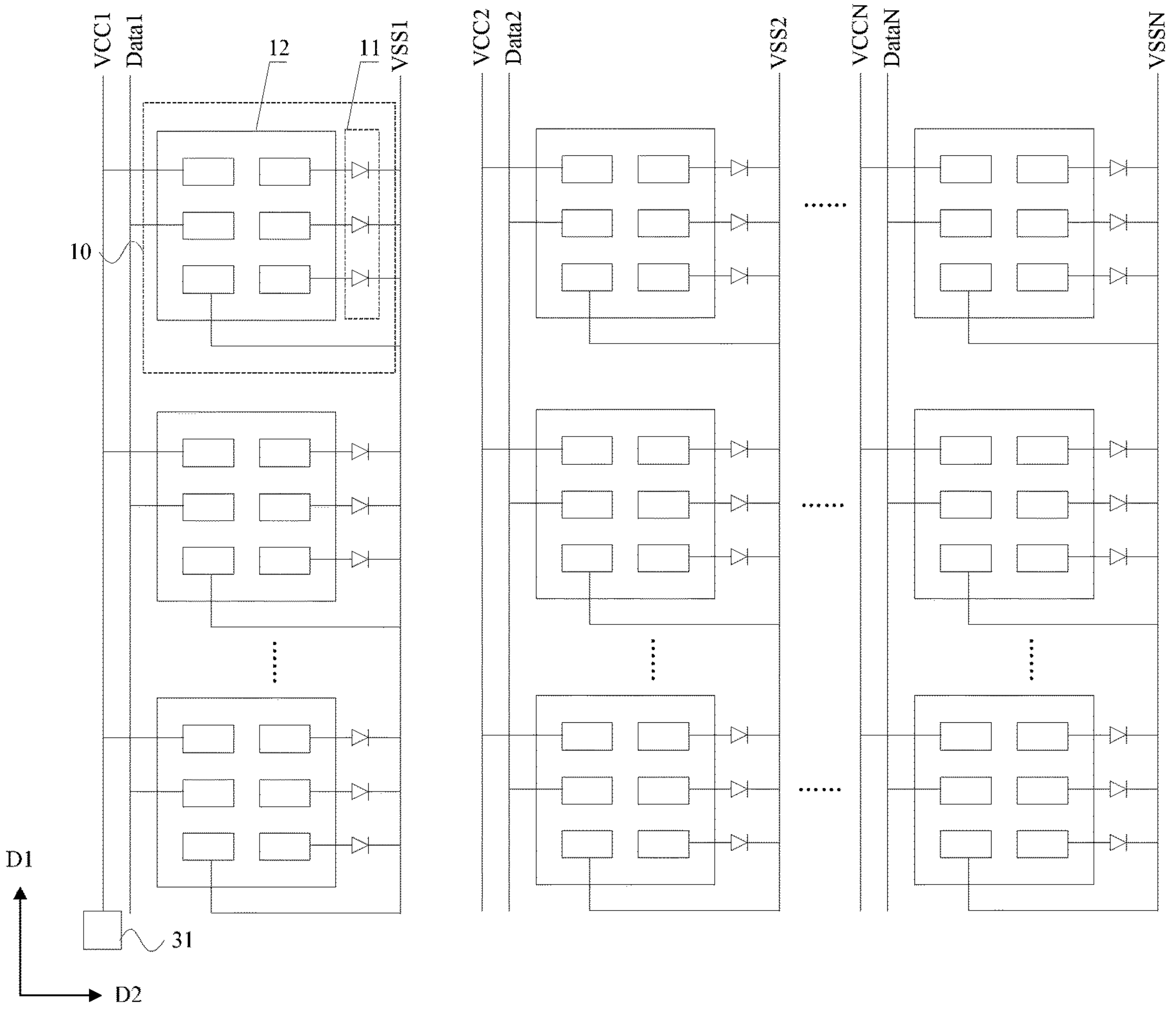
FIG. 6 is a schematic diagram I of a structure of a display panel according to an embodiment of the present disclosure.
Figure 7:
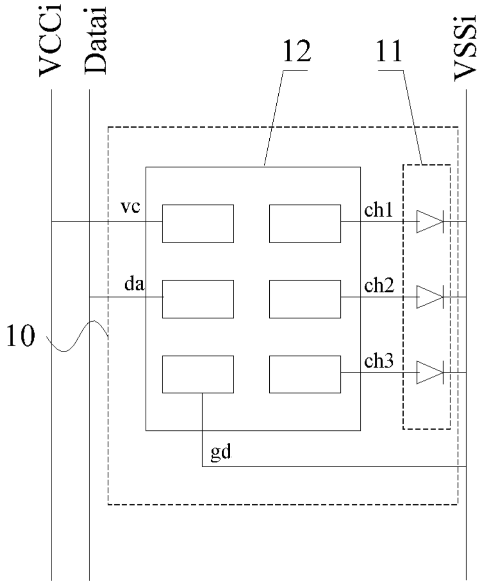
FIG. 7 is a schematic diagram of a connection relationship within pixel units in FIG. 6.
Figure 8:
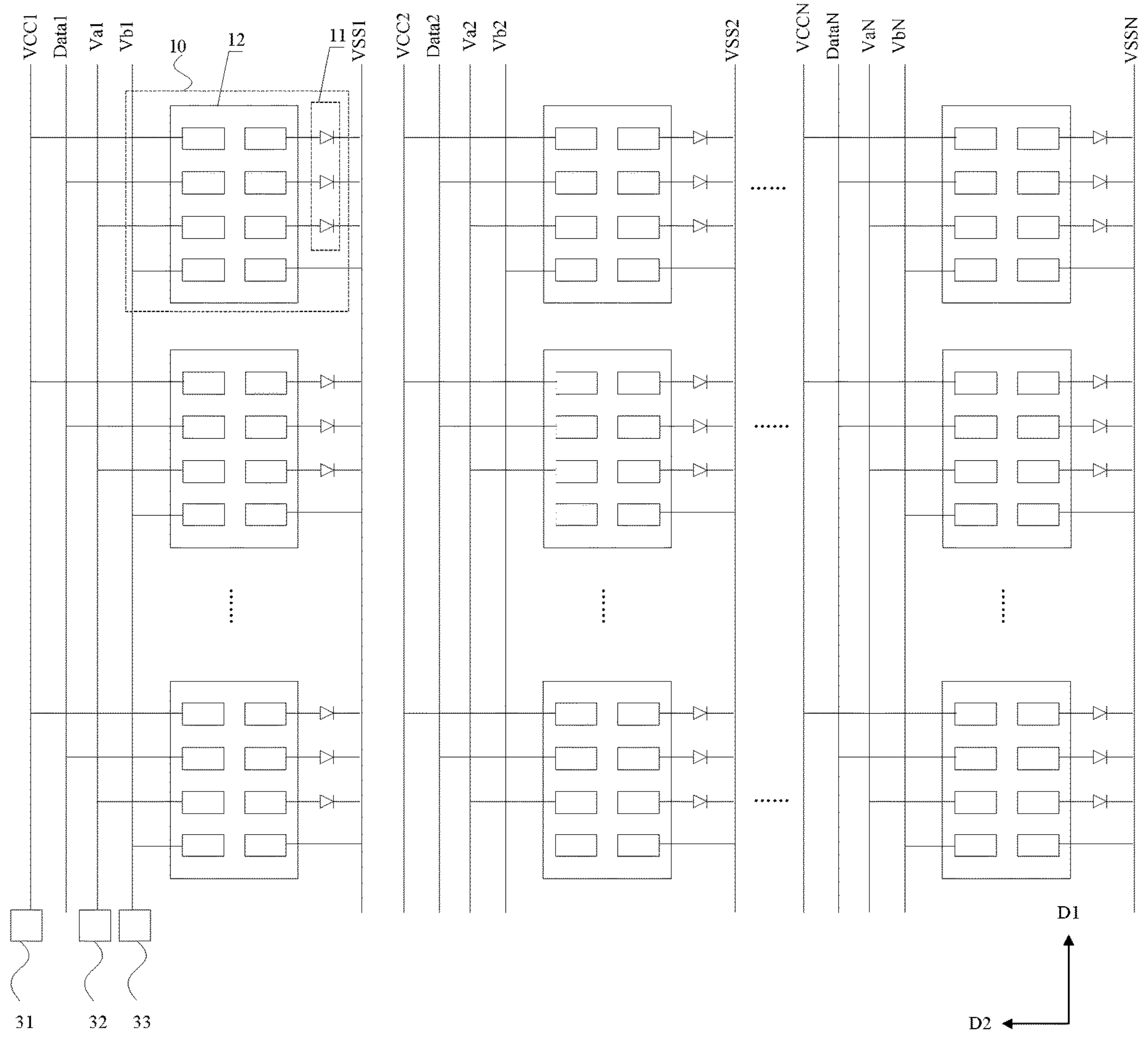
FIG. 8 is a schematic diagram II of a structure of a display panel according to an embodiment of the present disclosure.
Figure 9:
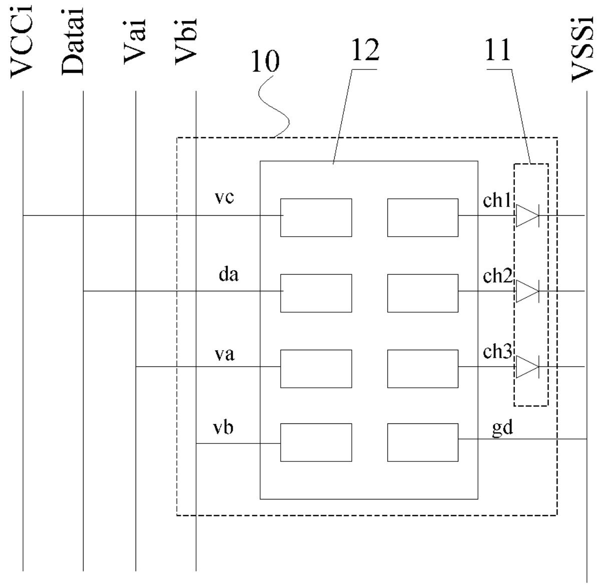
FIG. 9 is a schematic diagram of a connection relationship within pixel units in FIG. 8.

FIG. 6 is a schematic diagram I of a structure of a display panel according to an embodiment of the present disclosure, FIG. 7 is a schematic diagram of a connection relationship within pixel units in FIG. 6, FIG. 8 is a schematic diagram II of a structure of a display panel according to an embodiment of the present disclosure, and FIG. 9 is a schematic diagram of a connection relationship within pixel units in FIG. 8. As shown in FIG. 6 to FIG. 9, the display panel according to the embodiment of the present disclosure includes a plurality of first signal lines VSS1 to VSSN extending along a first direction D1 and a plurality of pixel units 10 arranged in an array in the first direction D1 and a second direction D2; the plurality of first signal lines VSS1 to VSSN are arranged along the second direction D2, and the first direction D1 and the second direction D2 intersect.

At least one pixel unit among the plurality of pixel units includes a component group 11 and a drive chip 12 configured to drive the component group 11 to emit light; the component group 11 includes K light emitting elements, and the drive chip includes K signal channel terminals, wherein K is a positive integer greater than or equal to 2. FIGS. 6 to 9 are illustrated by taking K=3 as an example, and three signal channel terminals are respectively a first signal channel terminal ch1 to a third signal channel terminal ch3.

For a pixel unit in a j-th row and an i-th column, cathodes of the K light emitting elements are electrically connected with an i-th first signal line VSSi, and anodes of the K light emitting elements are respectively electrically connected with the K signal channel terminals in the drive chip 12, 1≤j≤M, 1≤i≤N, and i and j are positive integers.

In an exemplary embodiment, an anode of an s-th light emitting element is electrically connected with an s-th signal channel terminal of the drive chip, 1≤s≤K, and s is a positive integer.

In an exemplary embodiment, a light emitting element may be a micro light emitting diode, which is not limited herein.

In an exemplary embodiment, a quantity of pixel units included in the display panel depends on a resolution of the display panel.

In an exemplary embodiment, a quantity of light emitting elements included in a component group in each pixel unit may be multiple, such as 3, 4, 5, 6, and 8. FIGS. 6 to 9 are illustrated by taking a case that the component group in each pixel unit includes three light emitting elements as an example, at this time, colors of the three light emitting elements may be the same or different. When the component group in the pixel unit includes at least four light emitting elements, colors of the at least four light emitting elements may be the same or different, and an arrangement mode of multiple light emitting elements may be set according to an actual situation, which is not limited here in the present disclosure.

In an exemplary embodiment, a first signal line VSS may transmit a ground signal or another fixed voltage signal.

In an exemplary embodiment, the display panel may further include a base substrate on which the pixel unit and the first signal line are disposed.

In an exemplary embodiment, a material of the base substrate may be selected from glass, quartz, plastic, polyimide, or polymethyl methacrylate, which is not limited here in the present disclosure.

In an exemplary embodiment, for the display panel, an electrical signal may be provided to a component group using an active address selection drive mode.

The display panel according to the embodiment of the present disclosure includes: a plurality of first signal lines extending along a first direction and a plurality of pixel units arranged in an array in the first direction and a second direction; the plurality of first signal lines are arranged along the second direction, and the first direction and the second direction intersect; at least one pixel unit among the plurality of pixel units includes a component group and a drive chip configured to drive the component group to emit light; the component group includes K light emitting elements, and the drive chip includes K signal channel terminals, wherein K is a positive integer greater than or equal to 2; for a pixel unit in a j-th row and an i-th column, cathodes of the K light emitting elements are electrically connected with an i-th first signal line, and an anode of an s-th light emitting element is electrically connected with an s-th signal channel terminal of the drive chip. In the embodiment of the present disclosure, cathodes of multiple light emitting elements located in a same pixel unit are connected with a same signal line, which may reduce a quantity of signal lines and devices of the display panel, reduce a difficulty of a routing process, and reduce drive power consumption and thermal power consumption of the display panel.

In an exemplary embodiment, in conjunction with FIGS. 6 to 9, the drive chip 12 may further include a fixed voltage signal terminal gd, and a fixed voltage signal terminal gd of a drive chip 12 of a pixel unit in a j-th row and an i-th column is electrically connected with an i-th first signal line VSSi.

In the present disclosure, the fixed voltage signal terminal gd of the drive chip of the pixel unit in the j-th row and the i-th column is electrically connected with the i-th first signal line VSSi, so that the i-th first signal line VSSi may provide a fixed voltage signal to the drive chip of the pixel unit in the j-th row and the i-th column to form a power supply loop, which may reduce a quantity of signal lines in the display panel and reduce an area occupied by the pixel unit.

As shown in FIGS. 6 to 9, in an exemplary embodiment, the display panel may further include: a plurality of second signal lines Data1 to DataN extending along the first direction D1 and a plurality of third signal lines VCC1 to VCCN extending along the first direction D1, the plurality of second signal lines Data1 to DataN are arranged along the second direction D2, and the plurality of third signal lines VCC1 to VCCN are arranged along the second direction D2.

In an exemplary embodiment, in conjunction with FIGS. 6 to 9, the drive chip 12 may further include a data signal terminal da and an addressing signal terminal vc, herein, the data signal terminal da of the drive chip 12 of the pixel unit in the j-th row and the i-th column is electrically connected with an i-th second signal line Datai and the addressing signal terminal vc of the drive chip 12 of the pixel unit in the j-th row and the i-th column is electrically connected with an i-th third signal line VCCi.

In the present disclosure, a drive chip in a pixel unit is electrically connected with a first signal line VSS, a second signal line Data, and a third signal line VCC. It may be seen that a quantity of signal lines connected with the drive chip is less, so that a quantity of signal lines of the display panel is less, and drive power consumption and thermal power consumption of the display panel are reduced.

In an exemplary embodiment, as shown in FIGS. 6 to 9, an i-th first signal line VSSi and an i-th second signal line Datai are respectively located on two sides of an i-th column of pixel units, and the i-th second signal line Datai and an i-th third signal line VCCi are located on a same side of the i-th column of pixel units.

In an exemplary embodiment, an i-th second signal line Datai may be located on a side of an i-th third signal line VCCi close to the drive chip 12, or may be located on a side of the i-th third signal line VCCi away from the drive chip 12. FIGS. 6 to 9 are illustrated by taking a case that the i-th second signal line Datai may be located on a side of the i-th third signal line VCCi close to the drive chip 12 as an example.

In an exemplary embodiment, a component group 11 of a pixel unit in a j-th row and an i-th column is located on a side of the drive chip 12 close to an i-th first signal line VSSi.

In an exemplary embodiment, as shown in FIGS. 6 to 9, K=3, K light emitting elements include a red light emitting element, a green light emitting element, and a blue light emitting element. A drive chip includes a first signal channel terminal ch1, a second signal channel terminal ch2, and a third signal channel terminal ch3; herein, the first signal channel terminal ch1 is electrically connected with an anode of the red light emitting element; the second signal channel terminal ch2 is electrically connected with an anode of the green light emitting element; the third signal channel terminal ch3 is electrically connected with an anode of the blue light emitting element.

In an exemplary embodiment, multiple light emitting elements in a component group 11 may be arranged along the second direction D2. Herein, a pitch between adjacent light emitting elements in the multiple light emitting elements arranged along the second direction may be about 80 μm to 120 μm for example, may be about 100 μm.

Figure 10:
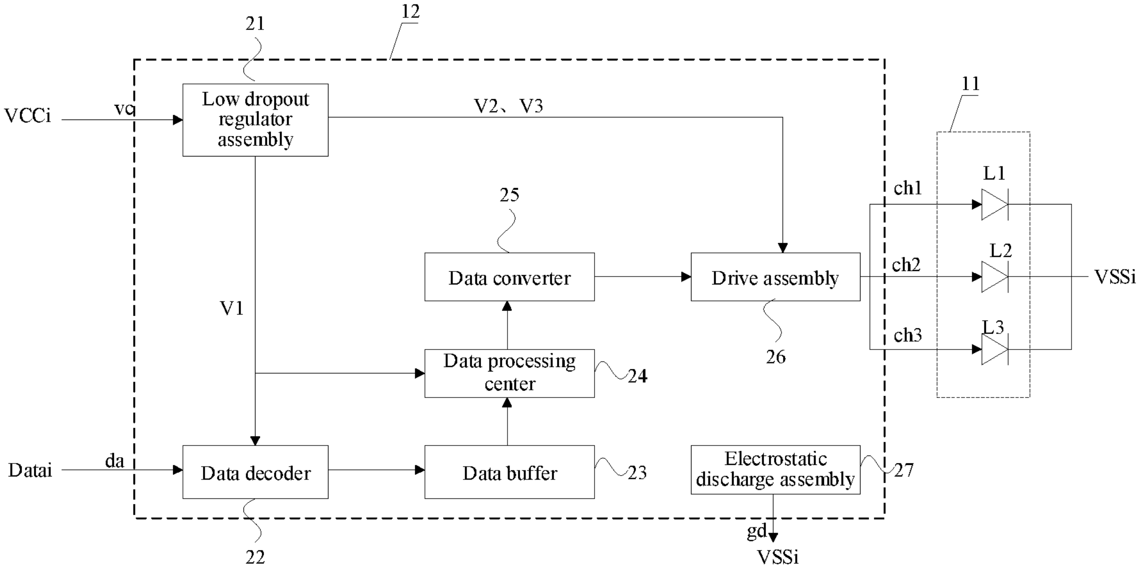
FIG. 10 is a schematic diagram I of a structure of a pixel unit according to an exemplary embodiment.
Figure 11:
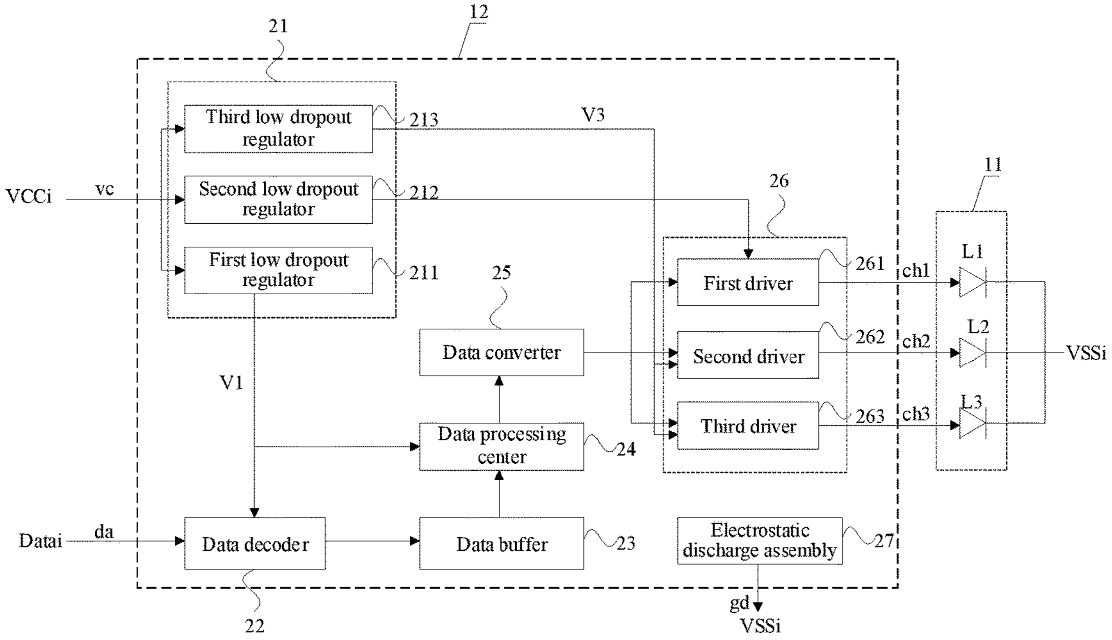
FIG. 11 is a schematic diagram II of a structure of a pixel unit according to an exemplary embodiment.
Figure 12:
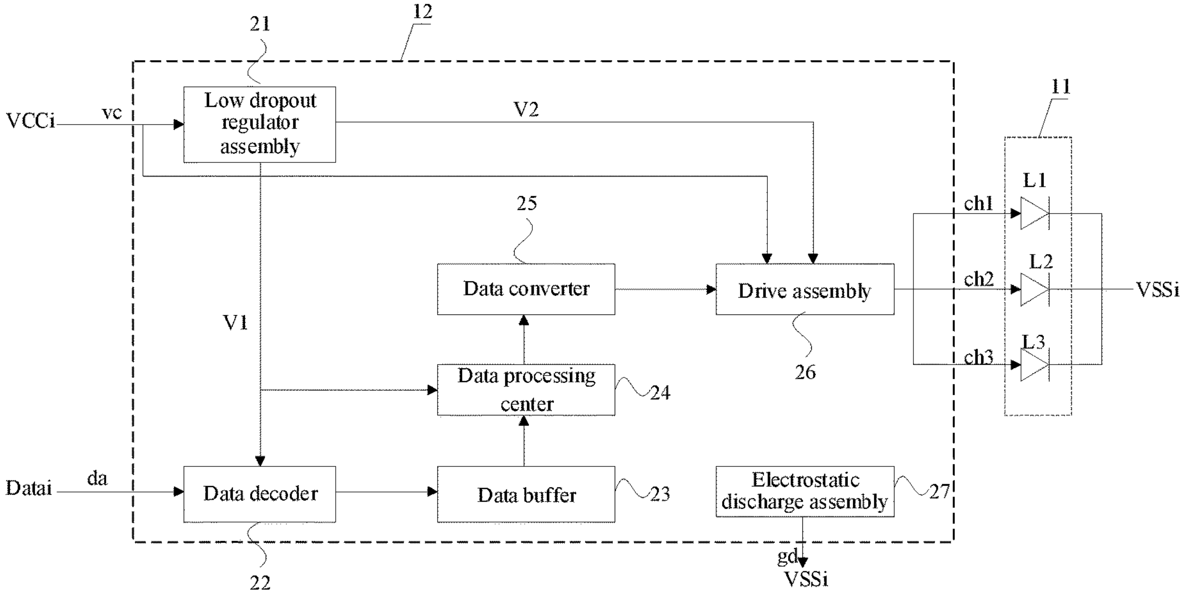
FIG. 12 is a schematic diagram III of a structure of a pixel unit according to an exemplary embodiment.
Figure 13:
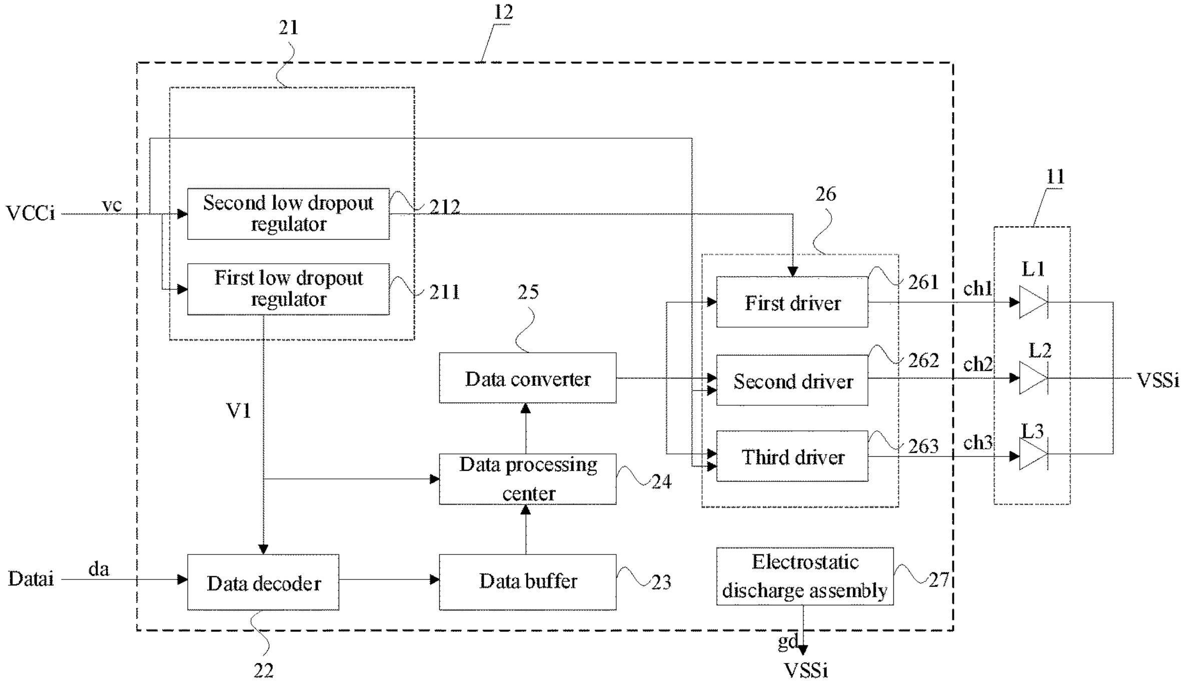
FIG. 13 is a schematic diagram IV of a structure of a pixel unit according to an exemplary embodiment.
Figure 14:
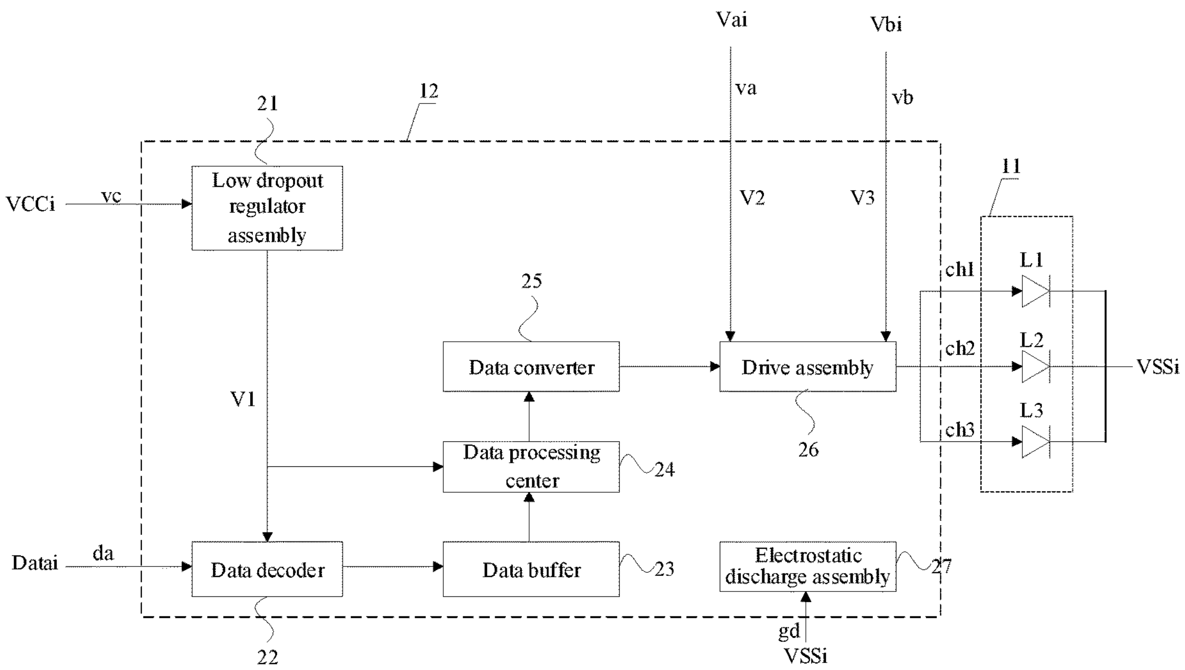
FIG. 14 is a schematic diagram V of a structure of a pixel unit according to an exemplary embodiment.
Figure 15:
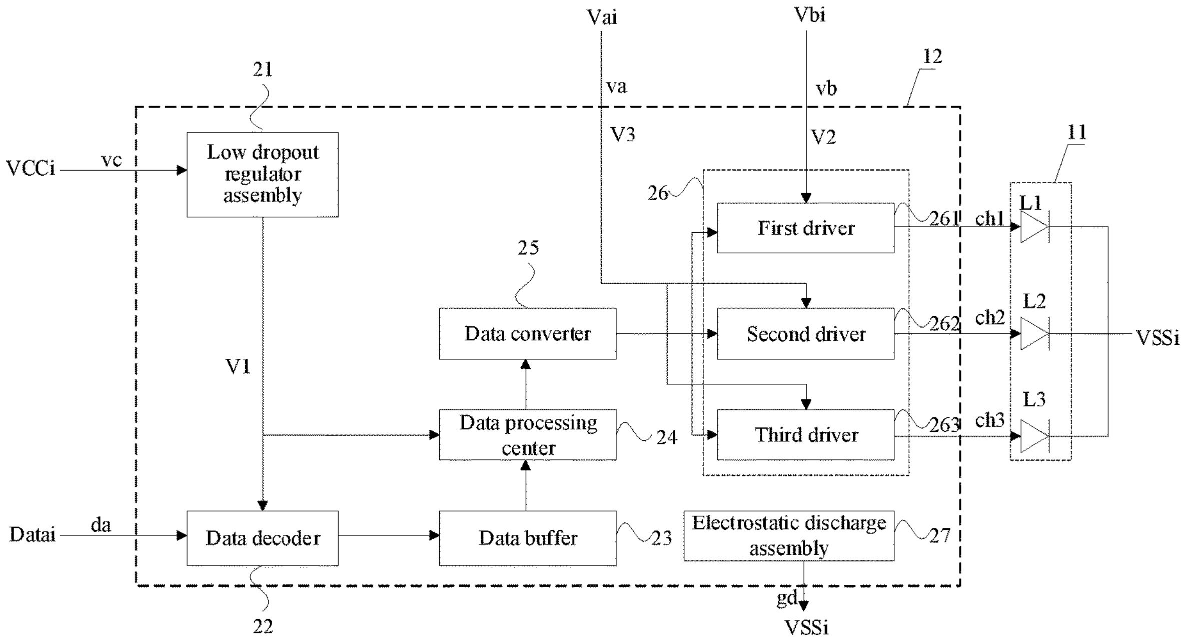
FIG. 15 is a schematic diagram VI of a structure of a pixel unit according to an exemplary embodiment.

FIG. 10 is a schematic diagram I of a structure of a pixel unit according to an exemplary embodiment, FIG. 11 is a schematic diagram II of a structure of a pixel unit according to an exemplary embodiment, FIG. 12 is a schematic diagram III of a structure of a pixel unit according to an exemplary embodiment, FIG. 13 is a schematic diagram IV of a structure of a pixel unit according to an exemplary embodiment, FIG. 14 is a schematic diagram V of a structure of a pixel unit according to an exemplary embodiment, and FIG. 15 is a schematic diagram VI of a structure of a pixel unit according to an exemplary embodiment. As shown in FIGS. 10 to 15, in an exemplary embodiment, a drive chip 20 may include a low dropout regulator assembly 21, a data decoder 22, a data buffer 23, a data processing center 24, a data converter 25, and a drive assembly 26.

In an exemplary embodiment, a component group in FIGS. 10 to 15 is illustrated by taking a case that three light emitting elements are included as an example. The three light emitting elements are a red light emitting element L1, a green light emitting element L2, and a blue light emitting element L3 respectively.

In an exemplary embodiment, the low dropout regulator assembly 21 may be electrically connected with an addressing signal terminal vc, the data decoder 22, and the data processing center 24, respectively, and be configured to convert a signal of the addressing signal terminal vc into a first voltage signal V1 to supply power to the data decoder 22 and the data processing center 24.

In an exemplary embodiment, the first voltage signal V1 is a power supply signal, which may continuously provide a high-level signal.

In an exemplary embodiment, the data decoder may be electrically connected with a data signal terminal da and the data buffer 23, respectively, and be configured to decode a data signal provided by the data signal terminal da to generate a first data signal, and transmit the first data signal to the data buffer 23.

In an exemplary embodiment, the first data signal may be a digital signal.

In an exemplary embodiment, the data buffer 23 may be configured to store the first data signal in bits.

In an exemplary embodiment, the data processing center 24 may be electrically connected with the data buffer 23 and the data converter 25, respectively, and be configured to acquire the first data signal stored in the data buffer 23, perform logical conversion on the first data signal stored in the data buffer 23 to generate a second data signal, and transmit the second data signal to the data converter 25.

In an exemplary embodiment, the second data signal may be a digital signal.

In an exemplary embodiment, the data converter 25 may be electrically connected with the drive assembly 26, and be configured to perform digital-to-analog conversion on the second data signal to generate a digital-to-analog conversion signal, perform pulse width modulation on the second data signal to form a pulse width modulation signal, and transmit the digital-to-analog conversion signal and the pulse width modulation signal to the drive assembly 26.

In an exemplary embodiment, the data processing center and the data converter may be of an integral structure or may be disposed separately, and FIGS. 10 to 15 are illustrated by taking a case that the data processing center and the data converter are disposed separately as an example.

In an exemplary embodiment, the digital-to-analog conversion signal is an analog voltage signal.

In an exemplary embodiment, the drive assembly 26 may be electrically connected with a component group 11, and be configured to generate a pulse width control signal according to the pulse width modulation signal, generate a constant current control signal according to the digital-to-analog conversion signal, and provide an electrical signal to the component group according to the pulse width control signal and the constant current control signal.

As shown in FIG. 6, in an exemplary embodiment, the display panel further includes a first Direct Current (DC) converter 31. Herein, the first DC converter 31 is electrically connected with a third signal line VCC and is configured to transmit a signal to the third signal line VCC.

As shown in FIGS. 10 to 13, in an exemplary embodiment, the low dropout regulator assembly 21 is further configured to convert a signal of the addressing signal terminal vc into a second voltage signal V2.

As shown in FIGS. 10 to 13, in an exemplary embodiment, the drive assembly 26 is further electrically connected with the low dropout regulator assembly 21, is configured to provide an electrical signal to the component group 11 according to the pulse width control signal, the constant current control signal, and the second voltage signal V2.

In an exemplary embodiment, the second voltage signal V2 is a power supply signal, which may continuously provide a high-level signal.

In an exemplary embodiment, as shown in FIGS. 10 and 13, the low dropout regulator assembly 21 may include a first low dropout regulator 211 and a second low dropout regulator 212. Herein, the first low dropout regulator 211 is electrically connected with the addressing signal terminal vc, the data decoder 22, and the data processing center 24, respectively, and is configured to convert a signal of the addressing signal terminal vc into a first voltage signal V1 to supply power to the data decoder and the data processing center 24; the second low dropout regulator 212 is electrically connected with the addressing signal terminal vc, and is configured to convert a signal of the addressing signal terminal vc to a second voltage signal V2.

In an exemplary embodiment, as shown in FIG. 11, the low dropout regulator assembly 21 is further configured to convert a signal of the addressing signal terminal vc into a third voltage signal V3.

In an exemplary embodiment, the third voltage signal V3 is a power supply signal, which may continuously provide a high-level signal.

In an exemplary embodiment, as shown in FIG. 11, the low dropout regulator assembly 21 may further include a third low dropout regulator 213. Herein, the third low dropout regulator 213 is connected with the addressing signal terminal vc and is configured to convert a signal of the addressing signal terminal vc into a third voltage signal V3.

In an exemplary embodiment, as shown in FIG. 11, the drive assembly 26 includes a first driver 261, a second driver 262, and a third driver 263.

In an exemplary embodiment, as shown in FIG. 11, the first driver 261 is electrically connected with the data converter 25, the second low dropout regulator 212, and the first signal channel terminal ch1, respectively, and is configured to provide an electrical signal to the red light emitting element L1 connected with the first signal channel terminal ch1 according to the pulse width control signal, the constant current control signal, and the second voltage signal V2.

In an exemplary embodiment, the first driver may be equivalent to a first switching transistor, a control electrode of the first driver is electrically connected with the data converter, a first electrode of the first driver is electrically connected with the second voltage signal, a second electrode of the first driver is electrically connected with the first signal channel terminal ch1, and the first driver is configured to supply the second voltage signal to the red light emitting element L1 connected with the first signal channel terminal ch1 under control of the pulse width control signal and the constant current control signal.

In the present disclosure, the first driver is electrically connected with the second low dropout regulator, which may reduce a quantity of DC converters in the display panel, simplify a structure of a drive circuit, and reduce an area occupied by the drive circuit.

In an exemplary embodiment, as shown in FIG. 11, the second driver 262 is electrically connected with the data converter 25, the third low dropout regulator 213, and the second signal channel terminal ch2, respectively, and is configured to provide an electrical signal to the green light emitting element L2 connected with the second signal channel terminal ch2 according to the pulse width control signal, the constant current control signal, and the third voltage signal V3.

In an exemplary embodiment, the second driver may be equivalent to a second switching transistor, a control electrode of the second driver is electrically connected with the data converter, a first electrode of the second driver is electrically connected with the third voltage signal, a second electrode of the first driver is electrically connected with the second signal channel terminal ch2, and the second driver is configured to supply the third voltage signal to the green light emitting element L2 connected with the second signal channel terminal ch2 under control of the pulse width control signal and the constant current control signal.

In an exemplary embodiment, as shown in FIG. 11, the third driver 263 is electrically connected with the data converter 25, the third low dropout regulator 213, and the third signal channel terminal ch3, respectively, and is configured to provide an electrical signal to the blue light emitting element L3 connected with the third signal channel terminal ch3 according to the pulse width control signal, the constant current control signal, and the third voltage signal V3.

In an exemplary embodiment, the third driver may be equivalent to a third switching transistor, a control electrode of the second driver is electrically connected with the data converter, a first electrode of the third driver is electrically connected with the third voltage signal, a second electrode of the third driver is electrically connected with the third signal channel terminal ch3, and the third driver is configured to provide the third voltage signal to the blue light emitting element L3 connected with the third signal channel terminal ch3 under control of the pulse width control signal and the constant current control signal.

The second driver and the third driver in the present disclosure are connected with a same low dropout regulator, which may not only reduce a quantity of low dropout regulators in a low dropout regulator assembly and simplify a structure of the low dropout regulator assembly, but also reduce a quantity of signal lines in the display panel and reduce drive power consumption and thermal power consumption of the display panel.

In an exemplary embodiment, as shown in FIGS. 12 and 13, the drive assembly 26 is also electrically connected with a third signal line S3 and is configured to provide an electrical signal to the component group 11 according to the pulse width control signal, the constant current control signal, and a signal of the addressing signal terminal vc.

In an exemplary embodiment, as shown in FIG. 12, the drive assembly 26 includes a first driver 261, a second driver 262, and a third driver 263.

In an exemplary embodiment, as shown in FIG. 13, the first driver 261 is electrically connected with the data converter 25, the second low dropout regulator 212, and the first signal channel terminal ch1, respectively, and is configured to provide an electrical signal to the red light emitting element L1 connected with the first signal channel terminal ch1 according to the pulse width control signal, the constant current control signal, and the second voltage signal V2.

In an exemplary embodiment, the first driver may be equivalent to a first switching transistor, a control electrode of the first driver is electrically connected with the data converter, a first electrode of the first driver is electrically connected with the second voltage signal, a second electrode of the first driver is electrically connected with the first signal channel terminal ch1, and the first driver is configured to provide the second voltage signal to the red light emitting element L1 connected with the first signal channel terminal ch1 under control of the pulse width control signal and the constant current control signal.

In the present disclosure, the first driver is electrically connected with the second low dropout regulator, which may reduce a quantity of DC converters in the display panel, simplify a structure of the drive circuit, and reduce an area occupied by the drive circuit.

In an exemplary embodiment, as shown in FIG. 13, the second driver 262 is electrically connected with the data converter 25, the addressing signal terminal vc, and the second signal channel terminal ch2, respectively, and is configured to provide an electrical signal to the green light emitting element L2 connected with the second signal channel terminal ch2 according to the pulse width control signal, the constant current control signal, and a signal of the addressing signal terminal vc.

In an exemplary embodiment, the second driver may be equivalent to a second switching transistor, a control electrode of the second driver is electrically connected with the data converter, a first electrode of the second driver is electrically connected with a signal of the addressing signal terminal vc, a second electrode of the second driver is electrically connected with the second signal channel terminal ch2, and the second driver is configured to provide the signal of the addressing signal terminal vc to the green light emitting element L2 connected with the second signal channel terminal ch2 under control of the pulse width control signal and the constant current control signal.

In an exemplary embodiment, as shown in FIG. 13, the third driver 263 is electrically connected with the data converter 25, the third signal line S3, and the third signal channel terminal ch3, respectively, and is configured to provide an electrical signal to the blue light emitting element L3 connected with the third signal channel terminal ch3 according to the pulse width control signal, the constant current control signal, and a signal of the addressing signal terminal vc.

In an exemplary embodiment, the third driver may be equivalent to a third switching transistor, a control electrode of the third driver is electrically connected with the data converter, a first electrode of the third driver is electrically connected with a signal of the addressing signal terminal vc, and a second electrode of the third driver is electrically connected with the third signal channel terminal ch3, and the third driver is configured to provide the signal of the addressing signal terminal vc to the blue light emitting element L3 connected with the third signal channel terminal ch3 under control of the pulse width control signal and the constant current control signal.

In the present disclosure, the second driver and the third driver are directly electrically connected with the addressing signal terminal vc, which may not only reduce a quantity of low dropout regulators in a low dropout regulator assembly and simplify a structure of the low dropout regulator assembly, but also reduce a quantity of signal lines in the display panel and reduce drive power consumption and thermal power consumption of the display panel.

In an exemplary embodiment, as shown in FIGS. 8 and 9, the display panel may further include a plurality of fourth signal lines Val to VaN extending along the first direction D1 and a plurality of fifth signal lines Vb 1 to VbN extending along the first direction D1, wherein the plurality of fourth signal lines Val to VaN are arranged along the second direction D2, and the plurality of fifth signal lines Vb 1 to VbN are arranged along the second direction D2.

In an exemplary embodiment, an i-th fourth signal line Vai and an i-th fifth signal line Vbi may be located on a same side of an i-th column of pixel units as an i-th second signal line Datai.

In an exemplary embodiment, the i-th fourth signal line Vai and the i-th fifth signal line Vbi may be located on a side of the i-th second signal line Datai close to the i-th column of pixel units, or on a side of the i-th second signal line Datai far away from the i-th column of pixel units.

In an exemplary embodiment, the i-th fourth signal line Vai may be located on a side of the i-th fifth signal line Vbi close to the i-th column of pixel units, or on a side of the i-th fifth signal line Vbi away from the i-th column of pixel units.

In conjunction with what shown in FIGS. 8 and 9, in an exemplary embodiment, the drive chip 12 may further include a first power input terminal va and a second power input terminal vb. A first power input terminal va of a drive chip of a pixel unit in a j-th row and an i-th column is electrically connected with the i-th fourth signal line Vai, and a second power input terminal vb of the pixel unit in the j-th row and the i-th column is electrically connected with the i-th fifth signal line Vbi.

In an exemplary embodiment, as shown in FIGS. 8 and 9, the display panel may further include a second DC converter 32 and a third DC converter 33. Herein, the second DC converter 32 is electrically connected with a fourth signal line and is configured to transmit a second voltage signal to the fourth signal line; the third DC converter 33 is electrically connected with a fifth signal line and is configured to transmit a third voltage signal to the fifth signal line.

In an exemplary embodiment, as shown in FIGS. 14 and 15, the drive assembly 26 includes a first driver 261, a second driver 262, and a third driver 263.

In an exemplary embodiment, as shown in FIGS. 14 and 15, the first driver 261 is electrically connected with the data converter 25, the first power input terminal va, and the first signal channel terminal ch1, respectively, and is configured to provide an electrical signal to the red light emitting element L1 connected with the first signal channel terminal ch1 according to the pulse width control signal, the constant current control signal, and the second voltage signal V2.

In an exemplary embodiment, the first driver may be equivalent to a first switching transistor, a control electrode of the first driver is electrically connected with the data converter, a first electrode of the first driver is electrically connected with the second voltage signal, a second electrode of the first driver is electrically connected with the first signal channel terminal ch1, and the first driver is configured to provide the second voltage signal to the red light emitting element L1 connected with the first signal channel terminal ch1 under control of the pulse width control signal and the constant current control signal.

In an exemplary embodiment, as shown in FIG. 15, the second driver 262 is electrically connected with the data converter 25, the second power input terminal vb, and an anode of the second signal channel terminal ch2, respectively, and is configured to provide an electrical signal to the green light emitting element L2 connected with the second signal channel terminal ch2 according to the pulse width control signal, the constant current control signal, and the third voltage signal V3.

In an exemplary embodiment, the second driver may be equivalent to a second switching transistor, a control electrode of the second driver is electrically connected with the data converter, a first electrode of the second driver is electrically connected with the third voltage signal, a second electrode of the second driver is electrically connected with the second signal channel terminal ch2, and the second driver is configured to provide the third voltage signal to the green light emitting element L2 connected with the second signal channel terminal ch2 under control of the pulse width control signal and the constant current control signal.

In an exemplary embodiment, as shown in FIG. 15, the third driver 263 is electrically connected with the data converter 25, the second power input terminal vb, and the third signal channel terminal ch3, respectively, and is configured to provide an electrical signal to the blue light emitting element L3 connected with the third signal channel terminal ch3 according to the pulse width control signal, the constant current control signal, and the third voltage signal V3.

In an exemplary embodiment, the third driver may be equivalent to a third switching transistor, a control electrode of the third driver is electrically connected with the data converter, a first electrode of the third driver is electrically connected with the third voltage signal, and a second electrode of the third driver is electrically connected with the third signal channel terminal ch3, and the third driver is configured to provide the third voltage signal to the blue light emitting element L3 connected with the third signal channel terminal ch3 under control of the pulse width control signal and the constant current control signal.

In the present disclosure, the second driver and the third driver are connected with a same DC converter, which may simplify a structure of a drive circuit in a pixel unit, and reduce drive power consumption and thermal power consumption of the display panel.

In an exemplary embodiment, as shown in FIGS. 10 to 15, the drive chip 20 may further include an electrostatic discharge assembly 27. Herein, the electrostatic discharge assembly 27 is electrically connected with a fixed voltage signal terminal gd.

In an exemplary embodiment, the electrostatic discharge assembly is configured to discharge static electricity from the outside such as touch.

The display panel according to the embodiment of the present disclosure may not only achieve energy saving and truly achieve module cold screen, but also has independent analog and digital loops, which may reduce noise interference, is easy to implement, and greatly improves a competitive advantage of the display panel. Herein, the module cold screen refers to that thermal power consumption of a display product module where the display panel is located is relatively low, so that temperature of a screen of the display product is relatively low in an operating state.

Figure 16:
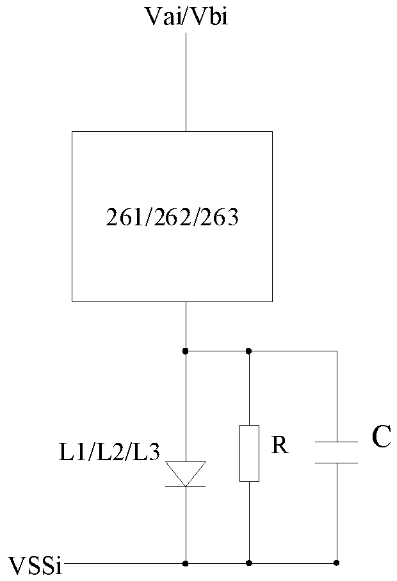
FIG. 16 is a diagram of a simplified principle of a circuit where a light emitting element is located.
Figure 17:
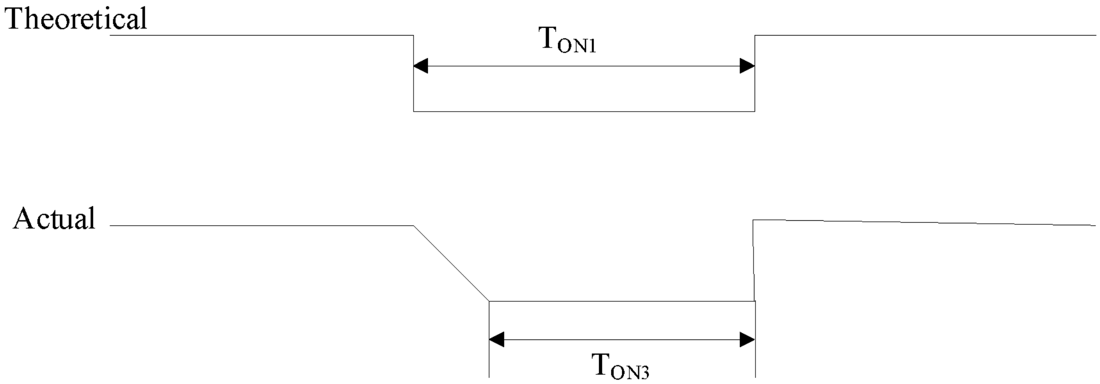

FIG. 16 is a diagram of a simplified principle of a circuit where a light emitting element is located, and FIG. 17 is a timing diagram of a signal for controlling a driver to be turned on. As shown in FIG. 16, a capacitance C is a parasitic capacitance, and the capacitance C may include: a parasitic capacitance existing in a light emitting element L1/L2/L3 itself, a parasitic capacitance of a drive chip, and an overlapping capacitance between signal lines; a first driver 261, a second driver 262, or a third driver 263 connected with the light emitting elements L1, L2, and L3, respectively, Vai/Vbi is a signal line that provides a voltage to a corresponding light emitting element L1/L2/L3. When a driver is turned on, Vai/Vbi provides an operating voltage to the light emitting element L1/L2/L3 and charges the capacitance C. At this time, the light emitting element L1/L2/L3 emits light. When a driver connected with the light emitting element L1/L2/L3 stops outputting a signal, since each of the light emitting element L1/L2/L3 further includes a resistor R connected in parallel therewith, the capacitance C may be rapidly discharged through the resistor R, so that an anode of the light emitting element L1/L2/L3 may be reset to a low voltage signal in a first signal line VSSi to ensure that a light emitting element L no longer emits light. FIG. 17 schematically shows signal waveforms for controlling a driver to be turned on in an ideal state and in an actual state using a drive architecture in an embodiment of the present disclosure. A theoretical duration of a signal path formed between a power supply signal line and the first signal line VSSi is Tom, and actual light emitting time of a light emitting element L in the drive architecture according to the embodiment of the present disclosure is $T_{ON3}$, $T_{ON3}$ is larger than duration $T_{ON2}$ of an effective level signal in FIG. 5. Therefore, a display effect of a display panel according to the present disclosure is better than that of the display panel provided in FIG. 5.

An embodiment of the present disclosure further provides a display apparatus, including a display panel.

In an exemplary embodiment, the display apparatus may be any product or component with a display function, such as a mobile phone, a tablet computer, a television, a display, a notebook computer, a digital photo frame, or a navigator.

Although implementation modes disclosed in the present disclosure are described as above, the described contents are only implementation modes which are used for facilitating understanding of the present disclosure, but are not intended to limit the present disclosure. Any skilled person in the art to which the present disclosure pertains may make any modification and variation in forms and details of implementation without departing from the spirit and scope of the present disclosure. However, the patent protection scope of the present disclosure should be subject to the scope defined in the appended claims.

The invention claimed is:

1. A display panel comprising: a plurality of first signal lines extending along a first direction and a plurality of pixel units arranged in an array in the first direction and a second direction; wherein the plurality of first signal lines are arranged along the second direction, and the first direction and the second direction intersect; at least one pixel unit among the plurality of pixel units comprises a component group and a drive chip configured to drive the component group to emit light; the component group comprises K light emitting elements, and the drive chip comprises K signal channel terminals, wherein K is a positive integer greater than or equal to 2; for a pixel unit in a j-th row and an i-th column, cathodes of the K light emitting elements are electrically connected with an i-th first signal line, and anodes of the K light emitting elements are respectively electrically connected with the K signal channel terminals in the drive chip, 1<j<M, 1<i <N, and i and j are positive integers, wherein the drive chip comprises: a low dropout regulator assembly, a data decoder, a data buffer, a data processing center, a data converter, and a drive assembly, a data signal terminal and an addressing signal terminal; the low dropout regulator assembly is electrically connected with the addressing signal terminal, the data decoder, and the data processing center, respectively, and has a circuitry for converting a signal of the addressing signal terminal into a first voltage signal to supply power to the data decoder and the data processing center; the data decoder is electrically connected with the data signal terminal and the data buffer respectively, and has a circuitry for decoding a data signal provided by the data signal terminal to generate a first data signal and transmitting the first data signal to the data buffer; the data buffer has a circuitry for storing the first data signal in bits; the data processing center is electrically connected with the data buffer and the data converter respectively, and has a circuitry for obtaining the first data signal stored in the data buffer, performing logical conversion on the first data signal stored in the data buffer to generate a second data signal, and transmitting the second data signal to the data converter; the data converter is electrically connected with the drive assembly, and has a circuitry for performing digital-to-analog conversion on the second data signal to generate a digital-analog conversion signal, performing pulse width modulation on the second data signal to form a pulse width modulation signal, and transmitting the digital-analog conversion signal and the pulse width modulation signal to the drive assembly; the drive assembly is electrically connected with the component group, and has a circuitry for generating a pulse width control signal according to the pulse width modulation signal, generating a constant current control signal according to the digital-analog conversion signal, and providing an electrical signal to the component group according to the pulse width control signal and the constant current control signal.

2. The display panel according to claim 1, wherein the drive chip further comprises: a fixed voltage signal terminal;

a fixed voltage signal terminal of a drive chip of the pixel unit in the j-th row and the i-th column is electrically connected with the i-th first signal line.

3. The display panel according to claim 1, further comprising: a plurality of second signal lines extending along the first direction and a plurality of third signal lines extending along the first direction, the plurality of second signal lines are arranged along the second direction, the plurality of third signal lines are arranged along the second direction;

a data signal terminal of a drive chip of the pixel unit in the j-th row and the i-th column is electrically connected with an i-th second signal line, and an addressing signal terminal of the drive chip of the pixel unit in the j-th row and the i-th column is electrically connected with an i-th third signal line.

4. The display panel according to claim 3, wherein the i-th first signal line and the i-th second signal line are respectively located on two sides of an i-th column of pixel units, and the i-th second signal line and the i-th third signal line are located on a same side of the i-th column of pixel units.

5. The display panel according to claim 4, wherein a component group of the pixel unit in the j-th row and the i-th column is located on a side of the drive chip close to the i-th first signal line.

6. The display panel according to claim 1, wherein the first signal line is configured to transmit a ground signal.

7. The display panel according to claim 3, wherein K=3, and the K light emitting elements comprise: a red light emitting element, a green light emitting element, and a blue light emitting element;

the drive chip comprises a first signal channel terminal, a second signal channel terminal, and a third signal channel terminal;

the first signal channel terminal is electrically connected with an anode of the red light emitting element;

the second signal channel terminal is electrically connected with an anode of the green light emitting element;

the third signal channel terminal is electrically connected with an anode of the blue light emitting element.

8. A display apparatus, comprising: the display panel according to claim 1.

9. The display panel according to claim 1, further comprising: a first Direct Current (DC) converter;

the first DC converter is electrically connected with a third signal line and has a circuitry for transmitting a signal to the third signal line.

10. The display panel according to claim 9, wherein the low dropout regulator assembly further has a circuitry for converting the signal of the addressing signal terminal into a second voltage signal.

11. The display panel according to claim 10, wherein the low dropout regulator assembly comprises: a first low dropout regulator and a second low dropout regulator;

the first low dropout regulator is electrically connected with the addressing signal terminal, the data decoder, and the data processing center, respectively, and has a circuitry for converting the signal of the addressing signal terminal into the first voltage signal to supply power to the data decoder and the data processing center;

the second low dropout regulator is electrically connected with the addressing signal terminal and has a circuitry for converting the signal of the addressing signal terminal into the second voltage signal.

12. The display panel according to claim 11, wherein the low dropout regulator assembly further has a circuitry for converting the signal of the addressing signal terminal into a third voltage signal;

the drive assembly has a circuitry for providing an electrical signal to the component group according to the pulse width control signal, the constant current control signal, the second voltage signal, and the third voltage signal.

13. The display panel according to claim 12, wherein the low dropout regulator assembly further comprises: a third low dropout regulator;

the third low dropout regulator is connected with the addressing signal terminal and has a circuitry for converting the signal of the addressing signal terminal into the third voltage signal.

14. The display panel according to claim 13, wherein the drive assembly comprises: a first driver, a second driver, and a third driver; the first driver is electrically connected with the data converter, the second low dropout regulator, and a first signal channel terminal, respectively, and has a circuitry for providing an electrical signal to a light emitting element connected with the first signal channel terminal according to the pulse width control signal, the constant current control signal, and the second voltage signal; the second driver is electrically connected with the data converter, the third low dropout regulator, and a second signal channel terminal, respectively, and has a circuitry for is providing an electrical signal to a light emitting element connected with the second signal channel terminal according to the pulse width control signal, the constant current control signal, and the third voltage signal; the third driver is electrically connected with the data converter, the third low dropout regulator, and a third signal channel terminal, respectively, and has a circuitry for providing an electrical signal to a light emitting element connected with the third signal channel terminal according to the pulse width control signal, the constant current control signal, and the third voltage signal.

15. The display panel according to claim 11, wherein the drive assembly is further electrically connected with the addressing signal terminal, has a circuitry for providing an electrical signal to the component group according to the pulse width control signal, the constant current control signal, and the signal of the addressing signal terminal.

16. The display panel according to claim 15, wherein the drive assembly comprises: a first driver, a second driver, and a third driver; the first driver is respectively connected with the data converter, the second low dropout regulator, and a first signal channel terminal, respectively, and has a circuitry for providing an electrical signal to the light emitting element connected with the first signal channel terminal according to the pulse width control signal, the constant current control signal, and the second voltage signal; the second driver is electrically connected with the data converter, the addressing signal terminal, and a second signal channel terminal, respectively, and has a circuitry for providing an electrical signal to the light emitting element connected with the second signal channel terminal according to the pulse width control signal, the constant current control signal, and the signal of the addressing signal terminal; the third driver is electrically connected with the data converter, the addressing signal terminal, and a third signal channel terminal, respectively, and has a circuitry for providing an electrical signal to the light emitting element connected with the third signal channel terminal according to the pulse width control signal, the constant current control signal, and the signal of the addressing signal terminal.

17. The display panel according to claim 9, further comprising: a plurality of fourth signal lines extending along the first direction and a plurality of fifth signal lines extending along the first direction, wherein the plurality of fourth signal lines are arranged along the second direction, and the plurality of fifth signal lines are arranged along the second direction;

the drive chip further comprises a first power input terminal and a second power input terminal;

a first power input terminal of the drive chip of the pixel unit in the j-th row and the i-th column is electrically connected with an i-th fourth signal line, and a second power input terminal of the pixel unit in the j-th row and the i-th column is electrically connected with an i-th fifth signal line.

18. The display panel according to claim 17, further comprising: a second DC converter and a third DC converter; the second DC converter is electrically connected with a fourth signal line and has a circuitry for transmitting a second voltage signal to the fourth signal line; the third DC converter is electrically connected with a fifth signal line and has a circuitry for transmitting a third voltage signal to the fifth signal line.

19. The display panel according to claim 18, wherein the drive assembly comprises: a first driver, a second driver, and a third driver; the first driver is electrically connected with the data converter, the first power input terminal, and a first signal channel terminal, respectively, and has a circuitry for providing an electrical signal to a light emitting element connected with the first signal channel terminal according to the pulse width control signal, the constant current control signal, and the second voltage signal; the second driver is electrically connected with the data converter, the second power input terminal, and a second signal channel terminal, respectively, and has a circuitry for providing an electrical signal to a light emitting element connected with the second signal channel terminal according to the pulse width control signal, the constant current control signal, and the third voltage signal; the third driver is electrically connected with the data converter, the second power input terminal, and the second signal channel terminal, respectively, and has a circuitry for providing an electrical signal to a light emitting element connected with the third signal channel terminal according to the pulse width control signal, the constant current control signal, and the third voltage signal.

* * * * *